Figure 1:
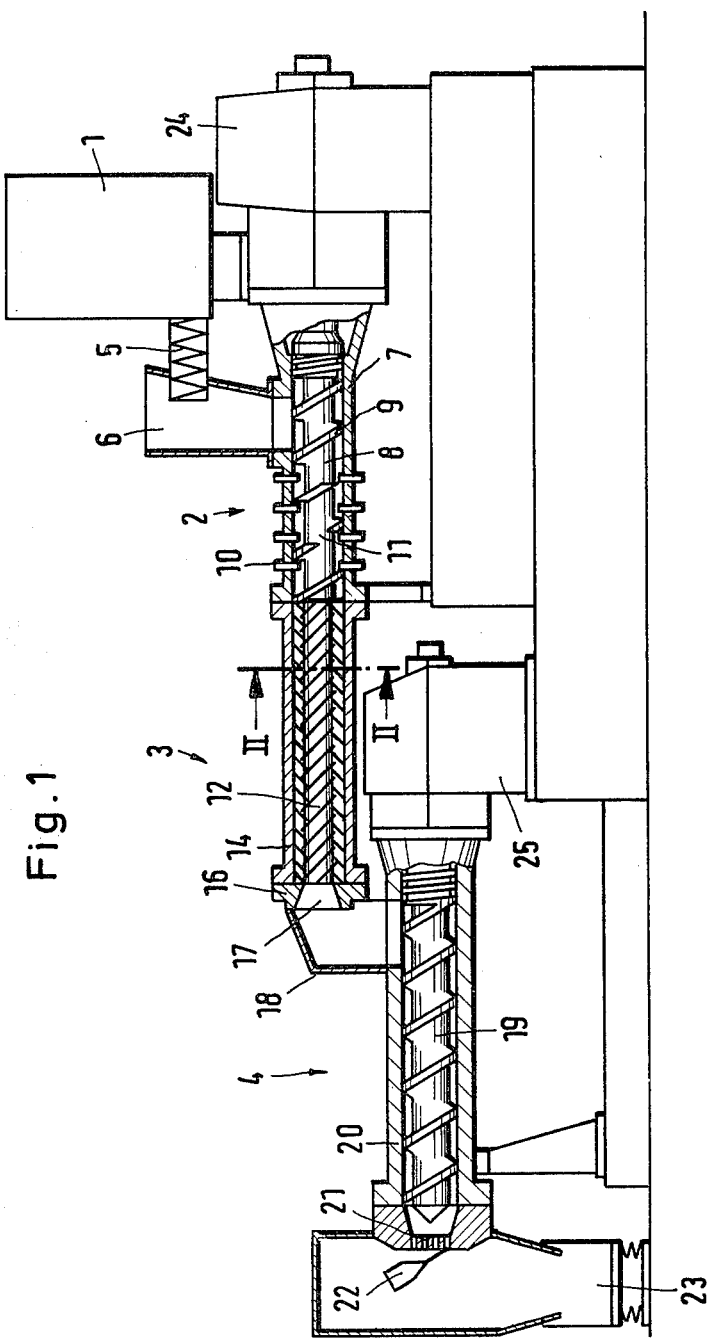

United States Patent [19]

Brinkmann

[11] 4,416,543

[45] Nov. 22, 1983

[54] APPARATUS FOR TREATING POWDERY RUBBER MIXTURES

[75] Inventor: Heinz Brinkmann, Bennigsen, Fed. Rep. of Germany

[73] Assignee: Hermann Berstorff Maschinenbau GmbH, Hanover, Fed. Rep. of Germany

[21] Appl. No.: 298,366

[22] Filed: Sep. 1, 1981

[30] Foreign Application Priority Data

Sep. 26, 1980 [DE] Fed. Rep. of Germany ....... 3036397

[51] Int. Cl.³ .................................................. B29B 1/10
[52] U.S. Cl. ........................................ 366/80; 366/83; 366/91; 366/288; 425/204
[58] Field of Search .................. 366/79, 80, 83, 91, 366/288, 89; 425/204, 207, 208

[56] References Cited

U.S. PATENT DOCUMENTS

| | | | |
|---|---|---|---|
| 3,349,725 | 10/1967 | Bini | 366/91 X |
| 3,861,844 | 1/1975 | Miller | 425/207 |
| 3,981,658 | 9/1976 | Briggs | 425/208 X |
| 4,176,967 | 12/1979 | Brinkmann et al. | 366/83 |
| 4,178,104 | 12/1979 | Menges et al. | 366/80 |
| 4,192,617 | 3/1980 | Spielhoff | 366/83 |
| 4,249,877 | 2/1981 | Machen | 366/79 X |
| 4,253,771 | 3/1981 | Renk | 366/89 |
| 4,289,409 | 9/1981 | Brand | 366/83 |

*Primary Examiner*—Stephen Marcus
*Assistant Examiner*—Joseph M. Pitko
*Attorney, Agent, or Firm*—Schwartz, Jeffery, Schwaab, Mack, Blumenthal & Koch

[57] ABSTRACT

Apparatus for treating powdery rubber mixtures to form processed intermediate products comprises volumetric metering means; a filling extruder; a mixing and plasticizing portion located at the downstream end of the filling extruder and having a central toothed spindle, toothed planetary spindles and an internally toothed housing; and forming out means shown as an extruder cascade connected to the mixing and plasticizing portion and extruding material through a perforated plate with cutting blades. The mixing and plasticizing portion is of only short length and can effect intensive working but does so for only a short period of time on the material passing therethrough so that the material is not damaged by being over-heated.

2 Claims, 2 Drawing Figures

APPARATUS FOR TREATING POWDERY RUBBER MIXTURES

The invention relates to apparatus for treating powdery rubber mixtures.

For the extrusion of rubber mixtures, it has long been known for the basic material for the working operation to be rubber in powder form, besides using ball rubber as the basic material for the working operation. Men skilled in the art are agreed in their view that processing rubber materials in powder form results in savings in regard to treatment times. The operator of the process can readily mix specific additive materials into the rubber material in powder form as supplied by a raw material manufacturer. Hitherto, it has been necessary for the operator processing the material to carry out a compacting operation, a plasticising operation and a dispersing operation on the above-mentioned manufactured rubber.

Hitherto, intermediate compacting of the powdery rubber mixture was carried out in a special compacting apparatus, in order to produce a non-homogenous but compact coherent strip, having the minimum possible discharge temperature. Provision was made for the strip to be used for charging special single-screw mixing extruders. It was found however that, with many of the mixtures used in the rubber-processing industry, it is not possible to design a mixing extruder which complies with all requirements in regard to through-put, material temperature and mixing and homogenisation action.

The invention provides apparatus by means of which the operation of intermediate compacting of the powdery rubber mixture is made unnecessary and which can be used in relation to all rubber mixtures in powder form which may be considered. Such a universal machine is preferably suitable for use in the mixing room and, besides the problem already stated hereinbefore, is intended to convert the mixing process which hitherto took place in a discontinuous manner, into a rational and continuous working process. In this connection, the apparatus must be able to pull in the powdery rubber mixture in a satisfactory manner and process it to form an intermediate product, with the minimum possible residence time, continuously and with a high degree of saving in respect of energy.

The aim of the invention is to provide an apparatus which provides for processing of material in an extremely careful manner from the thermal point of view and which uniformly pulls in the powdery rubber mixture and which therefore also provides a uniform through-put.

According to the invention, there is provided apparatus for treating powdery rubber mixtures to form processed intermediate products, said apparatus comprising a filling extruder having a rotary filling screw disposed in a filling extruder housing; a mixing and plasticising portion having a further housing secured to the downstream end of said housing, a central conveyor spindle coupled to the downstream end of said rotary filling screw, a plurality of axially freely movable planetary spindles symmetrically disposed around said central conveyor spindle within said further housing, which said further housing is disposed concentrically with said central conveyor spindle, teeth on said central conveyor spindle, further teeth on said planetary spindles, said teeth meshing with said further teeth to rotate said planetary spindles, internal teeth in said housing, said internal teeth cooperating with said further teeth to cause said planetary spindles to orbit about said central conveyor spindle and give a conveying action and a butting ring located in the region of the discharge end of said further housing axially to located said planetary spindles; and a forming-out means further to process material discharged by said mixing and plasticising portion.

In a surprising and unexpected manner, it has been found that the powdery rubber mixture can be processed in such apparatus to give an intermediate product with a high degree of homogeneity.

The mixture in powder form is properly pulled in by the filling screw, and conveyed into the mixing and plasticising portion.

Because the mixing and plasticising portion is formed from a central conveyor spindle having a plurality of planetary spindles arranged symmetrically therearound, and an internally toothed stationary housing, the result is, surprisingly, excellent compacting of the powdery rubber mixture, with simultaneous plasticisation and dispersion.

It must be emphasised in particular that the mixing and plasticising portion is extremely short in length and therefore has a very short processing length so that the powder rubber is also exposed only to a short and intensive thermal loading.

At the same time, a high level of through-put can be attained, in relation to the processing length of the mixing and plasticising portion.

The material is continuously rolled out to form thin layers, and turned over in layers, by the continuously repeating rolling processes between the central conveyor spindle and the planetary spindles disposed therearound.

This results in continuously renewed surfaces and thus gives the best heat transfer conditions. With the very large process surface area which is thus formed, the powder rubber is subjected to a plasticisation effect which is extremely careful from the thermal point of view and which is performed virtually without pressure. The individual components of the mixture are very uniformly distributed, thereby providing a high level of homogeneity in the final product obtained.

The material leaving the mixing and plasticising portion passes in free fall to the forming-out means which can be a forming-out extruder preferably disposed below the mixing and plasticising portion in a cascade-like manner.

Advantageously, the filling screw and the central spindle, which is secured thereto, of the mixing and plasticising portion is driven by first drive means and a screw of the forming-out extruder is driven by second drive means so that the screws can be driven at different speeds of rotation. Thus, by virtue of the cascade-like arrangement, it is possible to achieve separate optimisation of the two systems in regard to temperature control and discharge.

The filling extruder housing can mount pins which pass radially through the housing, are directed towards the axis of the filling screw and are adjustable in regard to their depth of insertion. The flights of the filling screw are interrupted radially at the points of penetration of the pins.

If for example the pins are engaged deeper into the housing, the mixing action of the filling screw is increased.

The finished mixture which issues in a pressure-free condition from the mixing and plasticising portion is received by the forming-out extruder which is arranged therebelow in a cascade-like arrangement. Alternatively, it is possible for the forming-out means to be rolling means since for certain mixtures, further processing of the finished mixture in the form of a skin may be desired.

The forming-out extruder can correspond in design to a hot-feed extruder which is adapted in regard to its dimensions to the conveyor capacity of the mixing and plasticising portion disposed upstream thereof.

For the purposes of producing processable feed strips or granulate, the forming-out extruder may be supplemented by suitable subsequent apparatuses, for example with a wide injection head for strips or a granulating system and cooling apparatus.

After storage, the finished mixture can be fed to an appropriate final processing machine such as an extruder, a calender, a press or an injection moulding machine.

Provision of axial or spiral internal grooves in the housing of the filling extruder can increase the conveying capacity and is to be recommended for dealing with some powder rubber mixtures.

Figure 2:
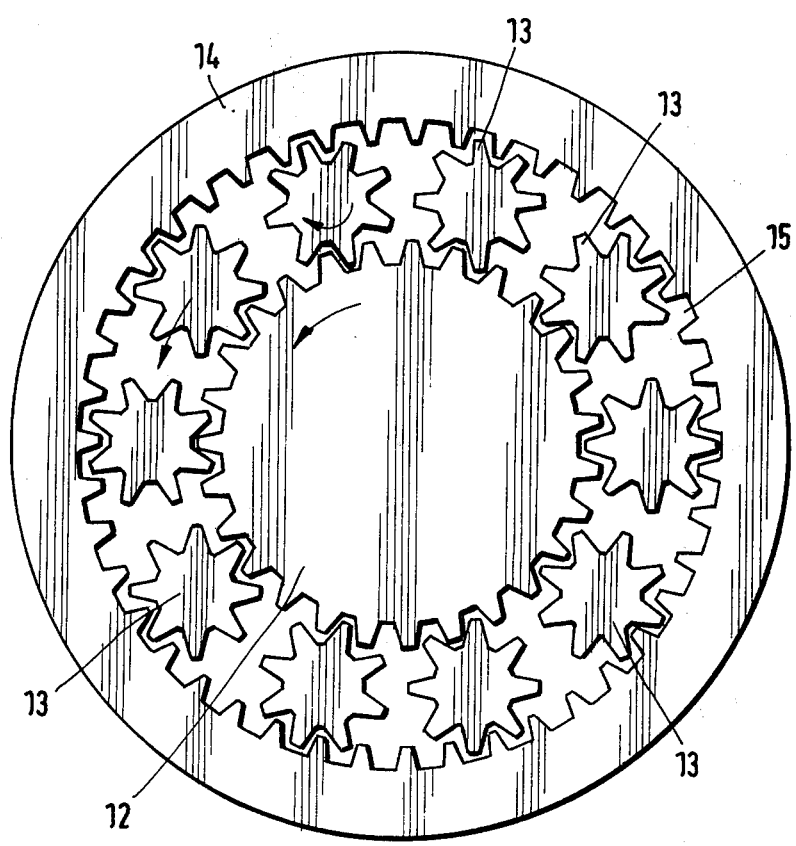

The invention is diagrammatically illustrated by way of example with reference to the accompanying drawings, in which:

FIG. 1 shows apparatus according to the invention for treating rubber mixtures in powder form; and FIG. 2 shows a view of the apparatus of FIG. 1 in cross-section taken on line II—II of FIG. 1.

Referring to the drawings, apparatus for treating powdery rubber mixtures comprises volumetric metering means 1, a filling extruder 2, a mixing and plasticising portion 3 and a forming-out extruder 4.

Crude rubber is obtainable after a milling or grinding process or directly after polymerisation in powder form with a grain size of respectively 1 to 1.5 mm. The finished powder mixture is produced in a high-speed mixer in accordance with a predetermined recipe or formula and is fed by means of a metering screw 5 from the volumetric metering means 1 into a hopper 6 of the filling extruder 2.

The filling extruder 2 comprises a cylindrical housing 7 with a filling screw 8 therein, the filling screw having flights 9 in a spiral configuration thereon.

In the illustrated embodiment of the invention, the housing 7 has radially adjustable pin assemblies 10 which are radially aligned with gaps 11 in the flights 9.

The mixing and plasticising portion 3 comprises a toothed central spindle 12 (see FIG. 2), toothed planetary spindles 13 which are disposed symmetrically around the central spindle 12, and a stationary housing 14 which is disposed concentrically with the central spindle 12 and has internal teeth 15. The planetary spindles are freely movable axially and are located by means of a butting ring 16.

The housing 7 and the housing 14 are bolted together in end-to-end relation and the upstream end of the central spindle 12 of the mixing and plasticising portion 3 is secured to the downstream end of the filling screw 8 so as to be rotated thereby. FIG. 2 shows that if the spindle 12 is rotated anti-clockwise, the planetary spindles 13 will rotate clockwise each about its own axis and the planetary spindles 13 will orbit in an anti-clockwise direction with their teeth meshed with the teeth of the central spindle 12 and the internal teeth 15 of the housing 14. Temperature regulation means of known kind are preferably provided for the central spindle 12 and the housing 14 of the mixing and plasticising portion 3.

The mixing and plasticising portion 3 has a discharge opening 17 from which material is ejected in a pressure-free condition to fall into a hopper 18 of the forming-out extruder.

A screw 19 of the forming-out extruder 4 is surrounded by a cylindrical housing 20. Disposed in a discharge opening of the extruder 4 is a perforated plate or disc 21 against which cutting blades 22 rotate whereby the extruded portions issuing through the plate 21 are cut off, the granulate materials thereby formed being collected in a collecting container 23. A drive means 24 is provided to drive the screw 8 and thus the central spindle 12 for rotation and a further separate drive means 25 is provided to drive the screw 19 for rotation.

The mode of operation of the apparatus is as follows:

Powder rubber mixture metered into the apparatus by the metering means 1 is compacted by means of the filling screw 8 and conveyed into the mixing and plasticising portion 3. In this portion of the apparatus, which is of only short structural length, the powder rubber mixture is subjected to intensive working but for only a short period of time.

By virtue of the rotary movement of the central spindle 12, the planetary spindles 13 are positively rolled around. The continuously occurring rolling processes produce an intensive but short-term shearing action in respect of the rubber powder, and therefore also produce an excellent plasticisation effect. Thin layers of powder rubber are continuously rolled out and turned over in layers, thereby providing continuously new surfaces.

The continuous formation of new surfaces on the powder rubber provides excellent heat transfer conditions. Virtually pressure-less plasticisation and uniform distribution of the components of the mixture can be achieved.

The teeth of the plasticising elements, that is to say, the teeth of the central spindle 12, the teeth of the planetary spindles 13 and the internal teeth 15 of the housing 14 are provided at an angle of between 35° and 55°, preferably 45°, to the longitudinal axis of the portion 3 and thus provide an axial displacement conveying action.

The compacted, plasticised and dispersed powder rubber mixture falls in a pressure-less condition into the hopper 18 of the forming-out extruder 4. The material is transported in the extruder 4, and a static pressure is built up by mans of the screw 19, for the purpose of overcoming the tool pressure, that is to say, in the embodiment illustrated, the resistance of the perforated plate or disc 21.

I claim:

1. Apparatus for treating powdery rubber mixtures to form processed intermediate products, said apparatus comprising a filling extruder having a rotary filling screw disposed in a filling extruder housing, and means for feeding the powdery rubber mixtures to said filling extruder housing; a mixing and plasticising housing secured to the downstream end of said filling extruder housing, said mixing and plasticising housing having teeth formed on the interior thereof and having positioned therein a central conveyor spindle having exterior teeth and rotatably coupled to the downstream end of said rotary filling screw and disposed concentrically in said plasticising housing, a plurality of axially freely movable planetary gear spindles having exterior teeth, said planetary gear spindles being symmetrically disposed around said central conveyor spindle within said plasticising housing, the teeth on said planetary gear spindles meshing with the internal teeth on said plasticising housing and the exterior teeth in said central conveyor spindle thereby causing said planetary spindles to orbit about said central conveyor spindle and provide a conveying action, said central conveyor spindle and said planetary spindle achieving essentially pressure-less plasticisation and uniform distribution and consequent homogeneity of the components of the powdery rubber mixtures, means located in the region of the discharge end of said plasticising housing axially to locate said planetary spindles, and a forming extruder at the downstream side of said plasticising housing to process material discharged from said mixing and plasticising housing, said forming-out extruder being in cascade arrangement with said plasticising housing to receive therefrom the essentially pressure-free components homogenized in said plasticizing housing.

2. Apparatus as claimed in claim 1, wherein said extruder housing has pins mounted therein directed radially towards the axis of said filling screw, means mounting said pins for radially adjustment to vary their radial depth of insertion, and said filling screw has flights which are radially interrupted to allow passage therethrough of said pins.

* * * * *